(12) United States Patent
Alvarez et al.

(10) Patent No.: US 10,284,654 B2
(45) Date of Patent: May 7, 2019

(54) TRUSTED VEHICLE TELEMATICS USING BLOCKCHAIN DATA ANALYTICS

(71) Applicant: Intel Corporation, Santa Clara, CA (US)

(72) Inventors: Ignacio Alvarez, Portland, OR (US); Mic Bowman, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 248 days.

(21) Appl. No.: 15/277,066

(22) Filed: Sep. 27, 2016

(65) Prior Publication Data

US 2018/0091596 A1 Mar. 29, 2018

(51) Int. Cl.
| H04L 29/06 | (2006.01) |
| H04L 29/08 | (2006.01) |
| H04L 9/32 | (2006.01) |
| H04W 4/40 | (2018.01) |

(52) U.S. Cl.
CPC ........... *H04L 67/12* (2013.01); *H04L 9/3239* (2013.01); *H04L 63/0428* (2013.01); *H04L 2209/38* (2013.01); *H04W 4/40* (2018.02)

(58) Field of Classification Search
CPC .................... H04L 63/0428; H04L 67/12
See application file for complete search history.

(56) References Cited

U.S. PATENT DOCUMENTS

| 7,317,974 B2 * | 1/2008 | Luskin | H04L 67/34 701/31.5 |
| 8,509,987 B2 * | 8/2013 | Resner | G07C 5/008 340/438 |
| 2003/0147534 A1 | 8/2003 | Ablay et al. | |
| 2004/0185842 A1 | 9/2004 | Spaur et al. | |
| 2005/0090236 A1 * | 4/2005 | Schwinke | H04M 1/82 455/415 |
| 2008/0119983 A1 * | 5/2008 | Inbarajan | G07C 5/008 701/36 |

(Continued)

OTHER PUBLICATIONS

"International Application Serial No. PCT/US2017/048359, International Search Report dated Oct. 11, 2017", 3 pgs.

(Continued)

*Primary Examiner* — Ali Shayanfar
(74) *Attorney, Agent, or Firm* — Schwegman Lundberg & Woessner, P.A.

(57) ABSTRACT

Various techniques for collection and processing of motor vehicle telematics data and establishing control over access to the telematics data are disclosed herein. In an example, a communication device (e.g., a computing device) operated by an owner or operator of a motor vehicle operates to receive telematics data from a telematics system, generate and transmit a derived indication of the telematics data (e.g., using a hash of the data), receive and process a request for information from the telematics data, and generate and transmit an answer and proof of the answer validity in response to the request for information. In an example, the proof of the answer validity may be provided as a zero knowledge proof. The proof may be verified using the derived indication of the telematics data, such as from an indication that is stored in a public distributed blockchain that is auditable and unalterable.

23 Claims, 7 Drawing Sheets

(56) References Cited

U.S. PATENT DOCUMENTS

| | | | | |
|---|---|---|---|---|
| 2008/0269978 A1* | 10/2008 | Shirole | G07C 5/008 | 701/29.5 |
| 2009/0119657 A1* | 5/2009 | Link, II | G06F 8/64 | 717/171 |
| 2010/0030582 A1* | 2/2010 | Rippel | G06Q 10/10 | 705/4 |
| 2011/0144858 A1 | 6/2011 | Yun et al. | | |
| 2011/0320492 A1* | 12/2011 | Inghelbrecht | G06Q 40/08 | 707/776 |
| 2012/0209632 A1* | 8/2012 | Kaminski | G06Q 40/08 | 705/4 |
| 2012/0259665 A1* | 10/2012 | Pandhi | G06Q 40/08 | 705/4 |
| 2013/0060583 A1* | 3/2013 | Collins | G06Q 40/08 | 705/4 |
| 2013/0212659 A1* | 8/2013 | Maher | H04L 63/06 | 726/6 |
| 2013/0317692 A1 | 11/2013 | Iga | | |
| 2014/0025955 A1 | 1/2014 | Bodin et al. | | |
| 2015/0264017 A1 | 9/2015 | Saed et al. | | |
| 2016/0087804 A1 | 3/2016 | Park et al. | | |
| 2017/0054611 A1* | 2/2017 | Tiell | G06F 17/30598 | |
| 2017/0364934 A1* | 12/2017 | Tiell | G06Q 30/0201 | |
| 2018/0080777 A1* | 3/2018 | Nimchuk | G01C 21/3415 | |

OTHER PUBLICATIONS

"International Application Serial No. PCT/US2017/048359, Written Opinion dated Oct. 11, 2017", 4 pgs.

* cited by examiner

TRUSTED VEHICLE TELEMATICS USING BLOCKCHAIN DATA ANALYTICS

TECHNICAL FIELD

Embodiments described herein generally relate to data storage, processing, and analytics activities occurring with data captured from motor vehicles, and, for some examples, the use of encryption and authentication techniques with a blockchain data store to verify vehicle telematics data.

BACKGROUND

Modern motor vehicle systems are becoming increasingly computerized. Vehicle electronics are controlled partially or entirely by microprocessors (computers) networked both internally and externally. This architecture has been the basis for advances in safety, fuel efficiency, and convenience. There is a clear trend in industry to enable telematics in vehicles, with telematics broadly defined as the collection and use of telecommunications and information processing in internal or connected motor vehicle systems. As a result of the advances in telematics systems, several automobile manufacturers have stated goals to enable telematics capabilities for all vehicle models produced in the upcoming decade.

Many recent products utilize data from telematics systems, such as in the field of vehicle tracking. As a result, the use of telematic data collection has been steadily growing for insurance, fleet management industry, and government purposes. Some of these products include aftermarket solutions that seek to log vehicle position and other driver performance data to either monitor driver vehicle and behavior or offer transportation-related services. Many businesses and products are also using vehicle telematics data to assist the collection of driver behavior data. However, the increasing collection of such data is accompanied by strong privacy concerns from customers who do not want their travel location or personal data being accessed or logged by third parties.

Automakers and telematics service providers have made large investments for technologies to help secure and encrypt communications to and from a vehicle, including the use of secure data centers, limiting and encrypting communications to specific services, white listing data access to particular vehicles, and sandboxing vehicle systems. However, security remains a large concern for vehicle users, as evidenced by vehicle security system workarounds and many publicized events involving telematic system vulnerabilities.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
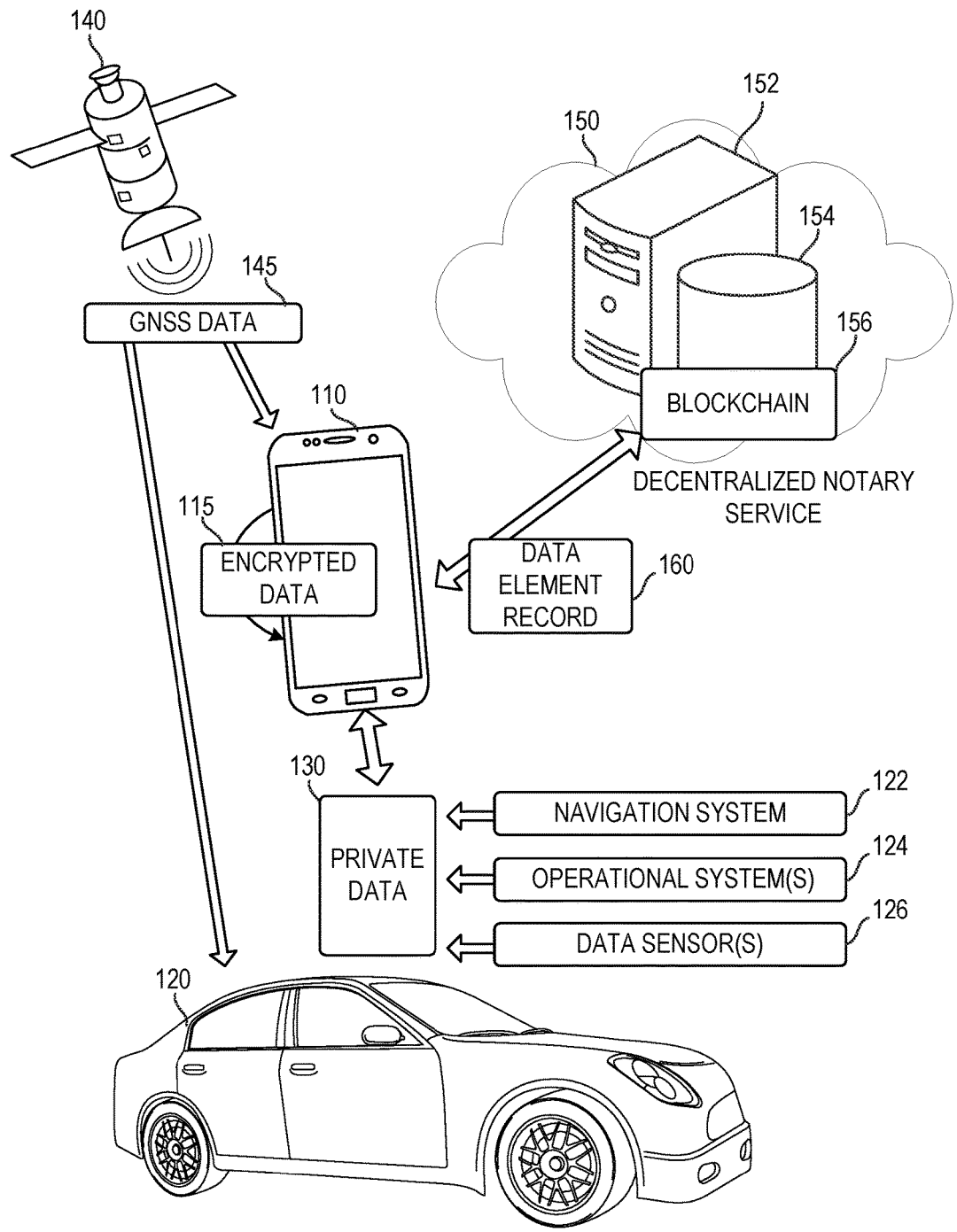
FIG. 1 illustrates systems and components used in an operational environment for the compilation and storage of data from a motor vehicle telematics system, according to an example.

In the following description, methods, configurations, device components, and related systems are disclosed that provide secure mechanisms for collection and processing of motor vehicle telematics data. The techniques discussed herein offer enhanced techniques for exchanging vehicle data information between parties that do not necessarily trust each other. With use of these techniques, end users (e.g., consumer data owners) may decide what data to share, and for what purpose. The techniques discussed herein also address the pain points often experienced by telematics service providers and automakers for the mass collection and verification of data, allowing anonymized encrypted data verification in public data centers with the use of a blockchain.

With the variety of telematics systems that operate in a motor vehicle, concerns are often raised on who "owns" and can freely access the data produced by the vehicle: a vehicle owner, an automaker, a service provider, a government entity, or some other involved third party. In an example, the techniques discussed herein allow control over such data by the vehicle owner or operator, while still providing relevant data points in response to an inquiry from the automaker, the service provider, the government entity, or the like. As discussed herein, the operation of the vehicle results in generation of telematics data, signed on the hardware level (as being authentic and untampered data), and encrypted with the user credentials (to stay secure and under the control of the user). The encrypted telematics data is stored in a database or location controlled by the user. The user may control whether to decrypt and offer the telematics data in response to a request, or in some examples, a specific data value, data answer, or like data calculation derived from the telematics data in response to the request.

In an example, data collection from a vehicle invokes a hardware-based signature for data points collected among components such as vehicle sensors, telematics units, or aftermarket devices utilized during driving activity. The hardware-signed data (for example, data values representing automotive operation characteristics such as geo-location, speed, acceleration, steering-wheel angle values), is combined with the driver's private software key, and a record of this data existence (but not the data itself) is stored in a block chain ledger. The resulting data may be encrypted and stored locally or remotely. The data may be communicated for entry in the block chain ledger using either the vehicle connectivity or the driver's cellular/internet connection, such as through a co-located smartphone or similar device, or wireless connectivity provided by the vehicle systems.

At a subsequent time, when an interested party (such as an insurance company, government agency, etc.) desires to retrieve some information about specific data values, the interested party submits the request to the data owner (the owner of the private encryption key, typically the motor vehicle driver). The data owner may perform the calculation on the encrypted data, and share back the result of the calculation. The result is accompanied by a proof that the result was correctly calculated from valid encrypted data points. The result may then be certified by the third party as being authentic, based on the proof provided by the data owner and the data established in the block chain ledger. Thus, as a result, the requesting third party may obtain a desired data answer, while the underlying raw data remains encrypted (secret) and under the control of the data owner.

Existing techniques for collecting and aggregating vehicle telematics data do not allow an anonymized yet verifiable collection of data. Some approaches log data into a vehicle's head unit or into a third party logging system (e.g., via an on-board diagnostic (OBD) system dongle), as the logged data is then later transmitted to the service provider. In these approaches, vehicle data is accessed by either physically accessing the data collection device (e.g. vehicle's on-board head unit) or through data center applications from the telematics service provider. However, the driver or vehicle owner has no control how the data is used or for what purposes, and the driver or vehicle owner must implicitly trust the service provider to handle the data securely and appropriately. With the techniques discussed herein, the ownership of the data is returned to the data generator—the vehicle operator or owner—by use of a private data encryption key that empowers the operator or owner to process the data and answer data queries from service providers as appropriate.

As one example, suppose that a government agency (such as a state Department of Transportation) desires to collect transportation tax based on measured road use within the State. Some transportation agencies have previously used dongle devices connected to a vehicle via the vehicle's Controller Area Network (CAN) Bus, collecting data with use of a mechanism such as a GPS device that periodically reports mileage based on GPS coordinates. In such a scenario, the vehicle driver has no control over the vehicle information that the government agency collects. With the techniques discussed herein, the vehicle driver may report only a calculation of the total number of miles driven in the State, accompanied by a proof of validity (correctness) of the calculation. With these techniques, the user may query the secure data, generate a report or calculate data value from the secure data, and provide the relevant data value back to an interested entity; the interested entity will obtain not only the result but also a proof point that the data has been calculated on authentic data and not on tampered or artificial data.

In another example, suppose that an automotive company such as the auto manufacturer desires to evaluate the performance of some component, such as a brake system, on a specific make and model. With existing approaches, if the vehicle includes remote telematics systems that are enabled, the manufacturer might remotely query and download all the braking system data, and store such data in the manufacturer's data center for analysis. If the vehicle is not enabled for remote telematics, a request might be sent to the manufacturer's dealer network to retrieve this data at the dealership when the make and model of the vehicle is serviced. In both cases, the vehicle owner or driver has no control of the data that is being shared and extracted from the vehicle. With the techniques discussed herein, assuming that the vehicle owner is the owner of the private key and has a copy of the data, the automaker may query a the vehicle owner to obtain the performance data. The vehicle owner may decide on whether to provide the data, the type of data to provide, and the specific data values and granularity of the data values to provide.

The features discussed herein may be enabled through a secure mechanism for storing sensor data, for handling and generating a response to a data analysis request, and for supporting the response to the data analysis request with blockchain data verification. In addition to the governmental and automaker user cases discussed above, information may be retrieved and collected on behalf of insurance companies, service providers, fleet managers, and other third parties in a variety of use cases and scenarios.

FIG. 1 illustrates example systems and components used in an operational environment for the compilation and storage of data from a motor vehicle telematics system, using the techniques discussed herein. It will be understood that additional components operational flows not depicted in FIG. 1 may be used to implement the following data storage techniques.

The overall process, illustrated in FIG. 1, may be used to generate a private, but provable, record of information obtained from a motor vehicle 120. As shown, a motor vehicle 120 operates a series of systems and sensors to generate private telematics data 130. These systems may include, for example, a navigation system 122 (e.g., a mapping system which tracks a location of the motor vehicle 120 in a geographical space), one or more operational systems 124 (e.g., electromechanical or electronic systems used to operate and control the motor vehicle 120), and one or more data sensors 126 (e.g., specialized sensors that collect data regarding the operational status of the motor vehicle 120, the operational systems 124, an environment of the motor vehicle 120, or the like).

The private telematics data 130 may involve the collection or communication of such data via a CAN Bus or another interconnect, bus, or interface of the motor vehicle 120. As an example of private telematics data 130, the navigation system 122 may produce location data (e.g., geographic coordinates) of the motor vehicle 120, with the location data being calculated from GNSS data 145 obtained from a global navigation satellite system (GNSS) 140, e.g., the United States Global Positioning System (GPS). As another example, the private telematics data 130 may be produced using an external device, such as location data being calculated from GNSS data 145 obtained using a smartphone or like connected form of the user device 110.

To accomplish a secure collection of telematics data, the motor vehicle 120 may provide a computational environment that includes a trusted execution environment (TEE) (such as implemented with Intel® Secure Guard Extensions (SGX)) and hardware support for secure input-output (IO) that provides a tamper-proof path between the sensors and the computational environment. Using this combination of hardware and sensor monitoring properties of the motor vehicle 120, the vehicle may gather contextual data, such as its location, and securely communicate those properties to the computational environment where the properties are cryptographically signed using a securely provisioned private key (such as an Enhanced Processor ID (EPID)). A signature on the sensor data may provide proof that the data originated from a specific sensor in a specific car. Anyone with the public key that corresponds to the private key used to sign the data may verify the integrity of the data.

In an example, the private telematics data 130 is communicated from the motor vehicle 120 to another device for storage and maintenance. For example, the private telematics data 130 (which may be cryptographically signed) is communicated to a connected user device 110, such as via a wireless personal area network (e.g., Bluetooth) or local area network (e.g., Wi-Fi) connection. On the connected user device 110, the private telematics data 130 is encrypted with a user key, producing encrypted data 115 that is stored (e.g., on data storage of the connected user device 110, or in a cloud service accessible to the connected user device 110) for later retrieval. In another example not depicted in FIG. 1, the private telematics data 130 is maintained in a specialized component of the motor vehicle 120 (e.g., embedded into the vehicle system), and is communicated on demand to the user device 110 or another like device. In still another example not depicted in FIG. 1, the data storage may occur with an aftermarket system connected to the motor vehicle via OBD-II or another interface.

In addition to the storage of the encrypted data 115, a data element record 160 that serves as a record of receipt or capture of the data is registered with a decentralized notary service 150. For example, the data element record 160 may be a receipt constructed using a cryptographic hash of the data, but not the actual data, along with a capture timestamp. In an example, the decentralized notary service 150 provides a distributed ledger such a blockchain 156 (e.g., such as a blockchain configuration commonly used for distributions of digital currency) for recording the data element record 160. The blockchain 156 may be implemented in data storage (such as data storage 154) of respective decentralized computing systems (such as computing system 152) in a public or private (e.g., controlled) setting. A distributed ledger such as the blockchain 156 may be used to a provable record of the existence of the particular telematics data represented by the data element record 160, and a relative timestamp for when the data element record 160 was generated or captured. The decentralized ledger also provides a total ordering for data records, and ensures non-repudiation of the record, meaning that the user (or another party) cannot rescind claims about the data records at a later time.

In an example, the storage of the encrypted data 115 may be extended to include other sensor data in the motor vehicle that is typically not provided from a telematics service. Such vehicle sensor data may be obtained from at least one operational subsystem or data sensor of the motor vehicle. The vehicle sensor data may be accessed with permission via a trusted service as described herein with the various telematics data storage and retrieval techniques. For example, the storage and retrieval of other types of vehicle sensor data (including raw sensor data) may be useful to automobile manufacturers, investigators, or users at a future time.

Figure 2:
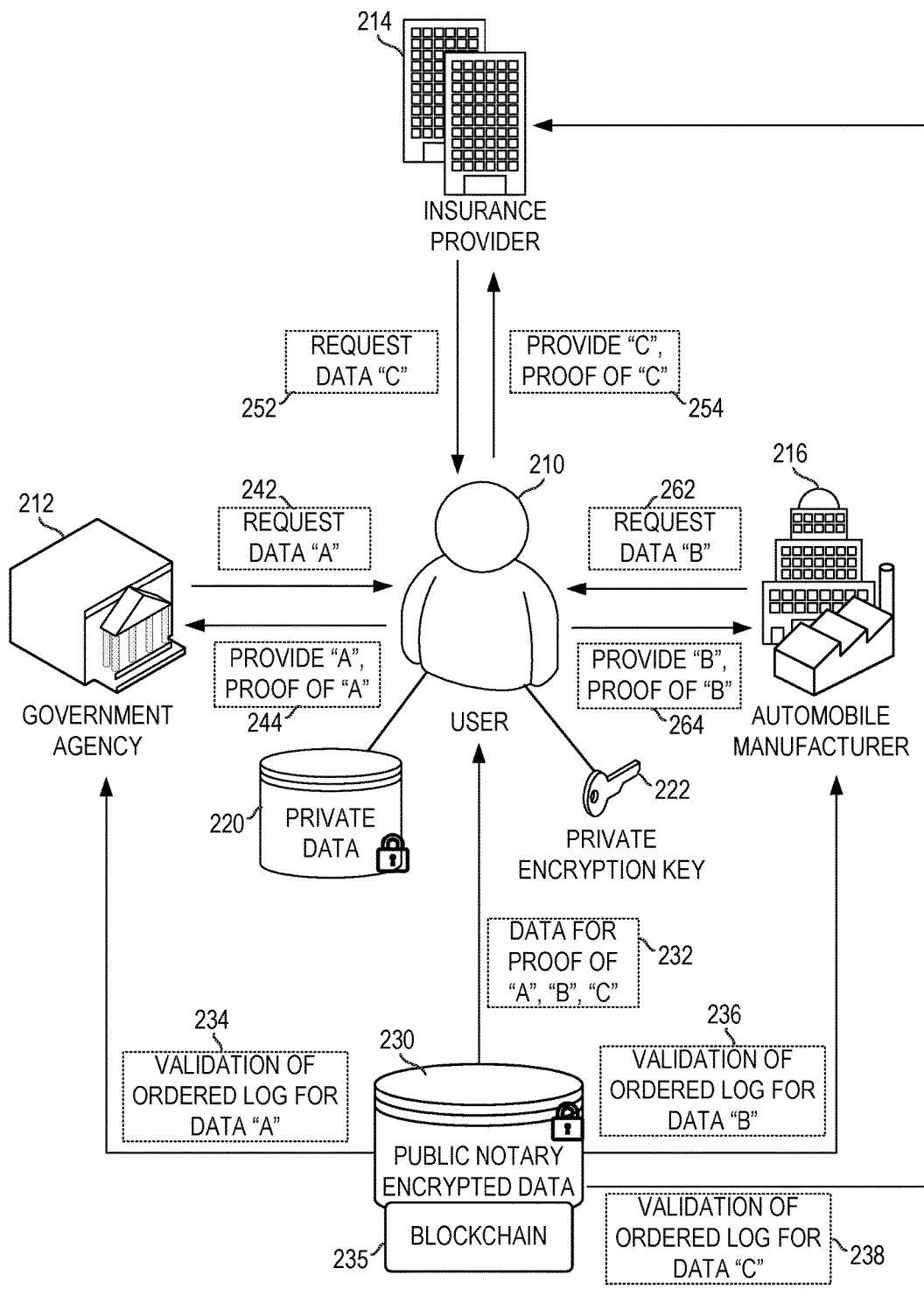
FIG. 2 illustrates a block diagram of respective scenarios involving data processing requests for securely stored data from a motor vehicle telematics system, according to an example.

FIG. 2 illustrates respective scenarios involving data processing requests for securely stored data from a motor vehicle telematics system using the techniques discussed herein. It will be understood that additional components, data, transactions, and parties not depicted in FIG. 2 may be used to implement the following techniques. For example, the techniques applied in FIG. 2 may be modified to capture and track data from multiple users (e.g., drivers), each of which may be collecting different (or overlapping) data from a motor vehicle using respective mobile computing devices.

The scenarios depicted in FIG. 2 illustrate the operations that occur when a user 210, such as the motor vehicle owner or operator, receives a data request for a specific data value (e.g., requesting an answer to a specific question that may be determined from vehicle telematics data). The following describes respective data request scenarios originating from a government agency 212, an insurance provider 214, and an automobile manufacturer 216.

For example, if the user 210 collects data about the vehicle's location throughout the year, the government agency 212 such as the state government department of transportation may ask the user to submit the number of miles driven within the state in order to generate an accurate road-use tax. This is shown in FIG. 2 with the request 242 for data "A", in this case, the number of in-state miles driven by the user 210. In response, the user 210 analyzes the request 242 and its data query, retrieves the data relevant to the data query that the user previously stored (in private data 220), computes an answer to the data query, and generates a proof that the answer is correct. The computation that generates the answer and proof occur on the user's computing device, which uses the user's private encryption key 222 to decrypt the private data 220. Thus, in response to the request 242, the user 210 will calculate "A", and provide the value of data "A" and proof of the correctness of "A" with a response 244.

In an example, the proof is constructed using a cryptographic technique referred to as a "zero knowledge" proof. The construction of the zero knowledge proof depends on the specific details of the question being asked. In an example, the proof of the validity of the answer is assisted by validation data 232 stored by the public notary 230, such as information in the blockchain 235 to provide a validation 234 of an ordered log of the private data used to calculate "A". The user 210 may obtain this validation data 232 when computing the proof of the specific answer. Consequently, the user's attestation that the data accurately reflects the property of a vehicle's sensor, and the provable ordering of data provided by the public notary 230, provide a mechanism for efficiently computing the proof and trusting the provided answer.

Continuing the example of in-state road-use taxation, the government agency 212 may also request an odometer reading for the beginning and ending of the taxation period, and a proof for the minimum number of miles driven outside the state. In addition to the odometer readings (that may be provided directly with the proof in response 244, including the attestations generated by the vehicle), the user 210 may collect information throughout the time period about the location of the vehicle. The location data is saved on the user's personal computing device, the motor vehicle, or another other storage or computing unit controlled by the user. The location data is saved at a rate of the user's choosing, and is persisted as the private data 220. The collection of more data may provide a more accurate representation of the data activities (e.g., a more precise measurement of the number of miles driven outside the state) while collecting less data may reduce costs of storage and computation at the cost of less accurate reporting. The actual computation of miles outside the state involves construction of a path through the points using a cryptographic accumulator to compute the number of miles and corresponding proof that the record of points was in fact outside state boundaries.

The computation of an answer (e.g., the number of miles traveled in a year) may be created from an aggregate of many pieces of information, including from multiple users, with each data value capable of being individually timestamped and logged as part of the blockchain. The granularity and accuracy of the answer thus may be dependent on the number of users, number of data sources (GPS, location service, odometer readings), and number of data points produced from the respective data sources that are logged to the blockchain (e.g., GPS readings captured every tenth of a mile, odometer readings captured every minute, etc.).

Other examples of data that may be requested are further illustrated in FIG. 2, to process requests from an insurance provider 214 and an automobile manufacturer 216. These may include driving characteristics data stored in the private data 220 (e.g., how many minutes did the vehicle exceed a certain speed, how many hard braking events occurred) relevant to a user's insurance assessment. The request for specific driving characteristics may occur from the insurance provider 214 with a request 252 for data "C", and a response 254 that includes the data value for data "C" and proof of the validity of "C". Based on the response 254 and the data value of "C" and proof of "C" included in the response 254, the automobile manufacturer 216 may perform a validation 238 of data "C" in the ordered log maintained within the blockchain 235. In a similar manner, the data that may be requested may include vehicle system data stored in the private data 220 for a vehicle operational system (e.g., number of errors encountered, vehicle operation time, vehicle operational characteristics) for a request 262 from an automobile manufacturer 216. Based on the response 264 and the data value of "B" and proof of "B" included in the response 264, the automobile manufacturer 216 may perform a validation 236 of data "B" in the ordered log maintained within the blockchain 235.

The data storage and retrieval techniques discussed herein may utilize existing or new hardware designs for use with legacy or new motor vehicles. These may include enhancements to vehicle sensor data hardware signatures and vehicle sensor data encryption and signatures, to enable the secure communication and storage of the private telematics data. Such features may be integrated with specialized capabilities from automotive hardware providers to encourage the hardware encryption and attestation of data. Further, the techniques discussed herein may involve the use of new data formats and message interfaces for blockchain-based telematics data storage and retrieval, such as is performed with the validations 234, 236, 238. The resulting answers may enable distributed data owner analytics for a variety of data, such as on-demand data analytics controlled by a vehicle data owner or operator (the private key owner); or telematics business models based on blockchain trust (including involving data owner approval to process the data analysis request and provide provable computation).

Figure 3:
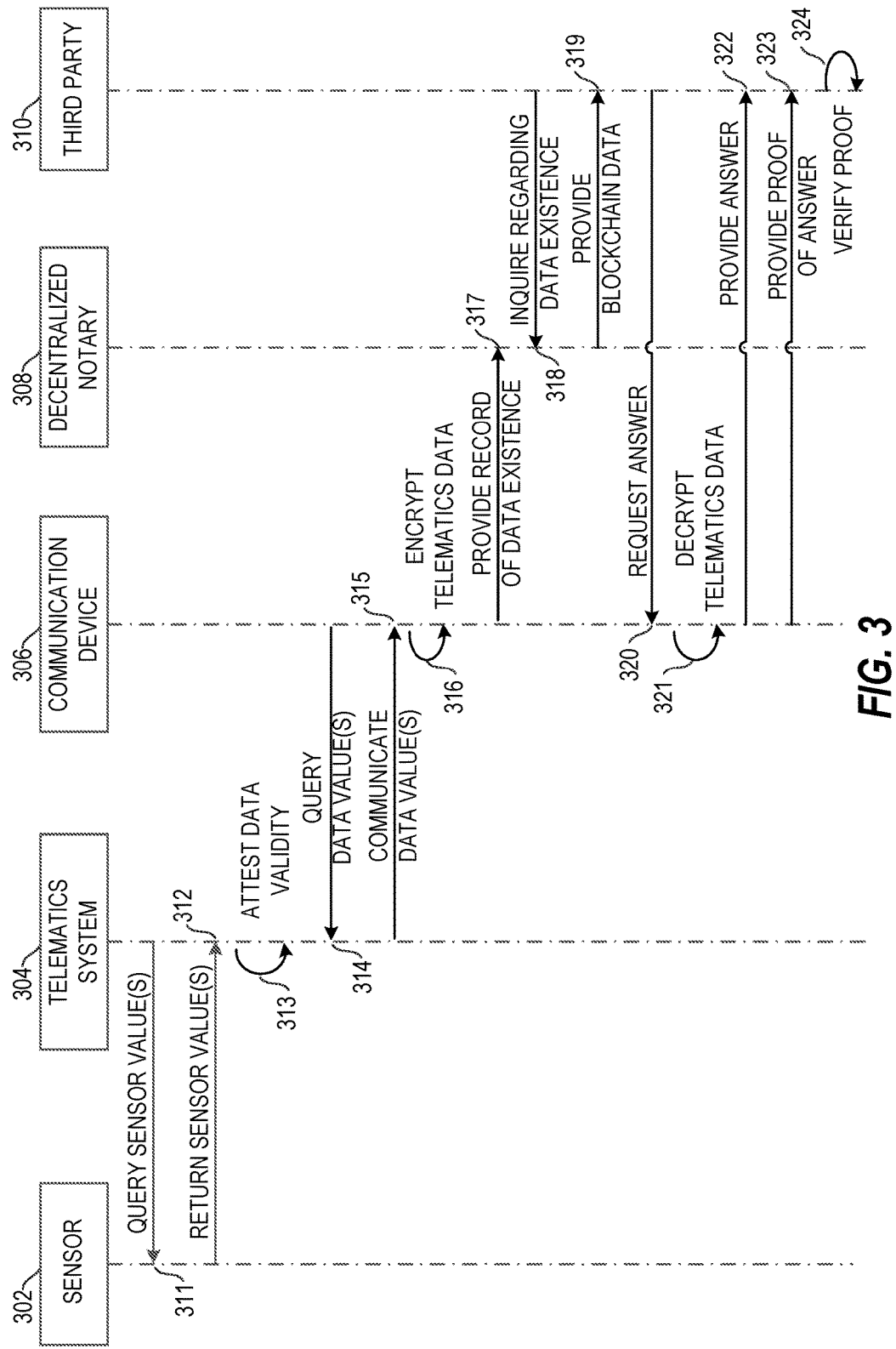
FIG. 3 illustrates a sequential diagram of operations performed for the compilation, storage, retrieval, and verification of data from a motor vehicle telematics system, according to an example.

FIG. 3 illustrates a sequential diagram of operations performed for the compilation, storage, retrieval, and verification of data from a motor vehicle telematics system. In an example, the sequence diagram includes respective operations performed among: a telematics data collection component, specifically, a sensor 302; a telematics data processing component, specifically, a telematics system 304; an intermediate data collection device, specifically, a communication device 306; a remote data storage location, specifically, a decentralized notary 308; and an interested party, specifically, a third party 310.

Further to the examples discussed above, the sequence diagram of FIG. 3 shows the operation of the telematics system to query data values (operation 311) from a sensor 302 (e.g., a telematics subsystem sensor), as the sensor 302 returns one or more data values (operation 312). The telematics system 304 may verify or attest the validity of the data values (operation 313), such as with use of digital signatures and encrypted communications. Further, the telematics system 304 may operate a trusted execution environment to obtain the one or more data values from the sensor 302 with secure I/O operations.

The communication device 306 operates to query relevant telematics sensor data values from the telematics system 304 (operation 314). In response, the telematics system 304 responds by communicating the telematics sensor data values back to the communication device 306 (operation 315). In response, the communication device 306 operates to persist and securely store the data, such as may be performed with an operation to encrypt the data (operation 316). Additionally, the communication device 306 provides a record of the existence of the data to a decentralized notary 308, such as a hash of the data (operation 317). In response, the decentralized notary 308 maintains a ledger of the record of the data existence (including a date/time stamp of the data), such as through use of an irrevocable blockchain data record.

At a subsequent time, a third party 310 may request a specific value or data answer from the communication device 306 and verify the existence of the data value. As an example, the third party 310 may request the data directly from the vehicle operator in response to a government or corporate inquiry, or in response to an event such as an investigation or a lawsuit. As another example, the third party may only request a result from an operation on the data (an answer), and the result of this operation can be provided or checked with the blockchain proof that the original data and the calculated result(s) are legitimate.

The verification from the decentralized notary 308 may include an inquiry regarding the data existence (operation 318) and the provision of data from the ledger (e.g., blockchain data record) (operation 319). This occurs in concert with the request from the third party 310 to the communication device 306 for some answer or data value to be obtained from the telematics data (operation 320). The communication device 306 operates to decrypt the telematics data (operation 321), compute an answer and proof of the answer, and then transmit the answer (operation 322) and proof of the answer (operation 323) to the third party 310. The proof then may be verified by the third party 310 (operation 324). In some examples, the request and verification of the data values from the decentralized notary 308 (operations 318, 319) occurs after receipt of the answer and proof of the answer from the communication device 306 (operations 322, 323).

The blockchain data storage, retrieval, and distributed on-demand data analytics techniques support several value propositions for users, motor vehicle manufacturers, and third parties. These include data controls that present clear advantages in security, data integrity, trust between parties and data ownership. Telematics service providers may also achieve technical benefits for such a solution based on reduced data storage and processing requirements. Most importantly, users will have direct visibility and control to private telematics data (and the use of such telematics data), and may enable control over on-demand analytics to this data.

Figure 4:
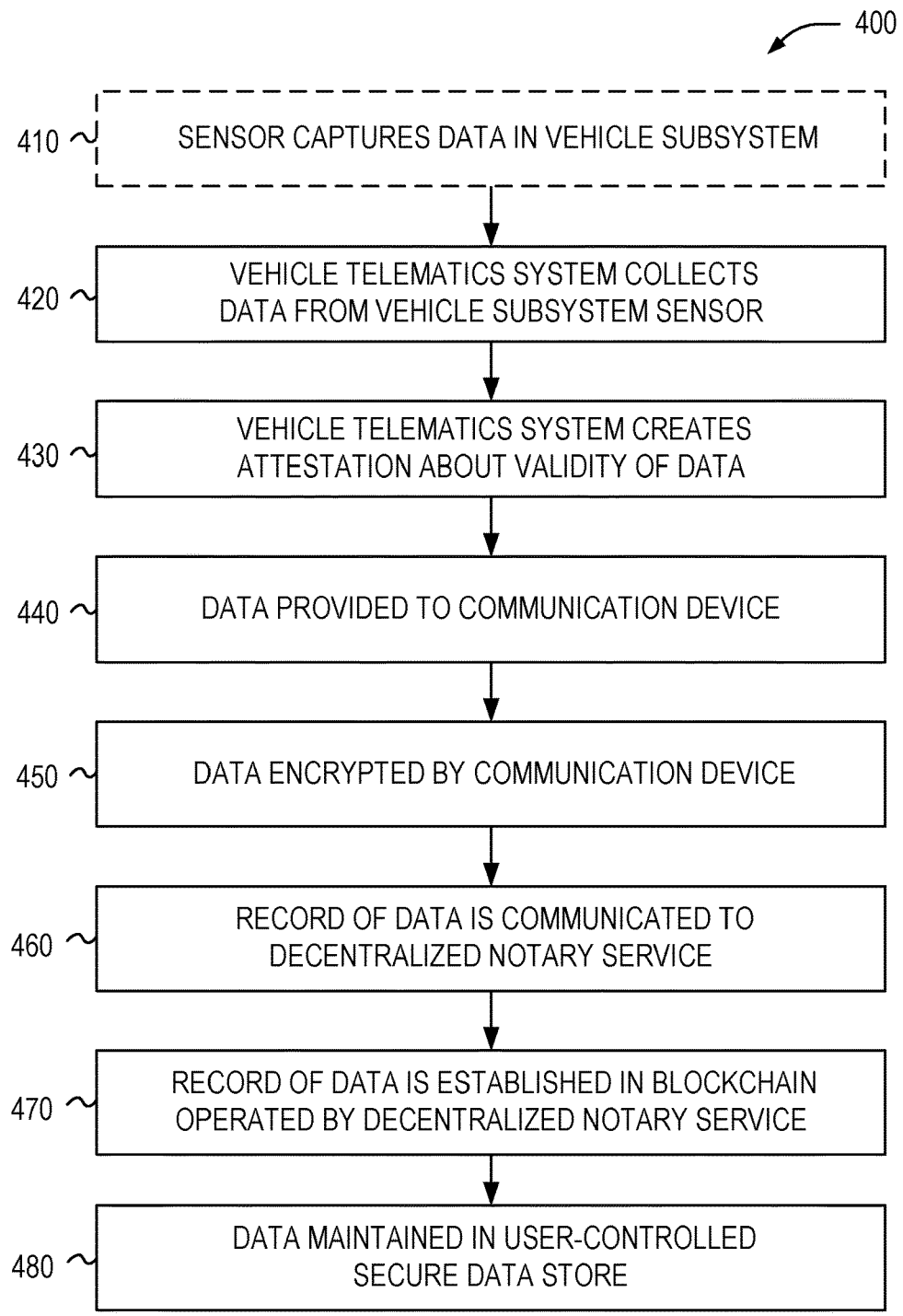
FIG. 4 illustrates a flowchart of a method performed for the secure storage and tracking of data collected from a motor vehicle telematics system, according to an example.

FIG. 4 illustrates a flowchart 400 of an example method performed for the secure storage and tracking of data collected from a motor vehicle telematics system. In an example, the method of flowchart 400 is performed by components including the vehicle telematics system and a connected communication device (e.g., a user computing device), each of which comprises electronic circuitry specifically configured (e.g., with programmed software) to perform the respective operations. However, it will be understood that the following techniques may be modified for additional or substitute processing actions at another data processing system or service, such as a remote computing system, or entirely within the context of a controllable on-board system within the motor vehicle.

As shown, the flowchart 400 includes operations for processing the data obtained from a telematics system, such as may originate from the capture of data from a sensor in a particular vehicle subsystem (operation 410). This step is optional in some examples, as the data may also originate from other intermediate sources, or may be previously collected or provided to the vehicle telematics from another source (or multiple sources). Based on the availability of data, the vehicle telematics system collects the data from the vehicle subsystem sensor (e.g., using communication over the motor vehicle communication bus), verifies the data, and creates an attestation for the validity of the data (operation 430).

The flowchart 400 further includes the depiction of operations to provide and store the telematics data at an external source (operations 440-490), such as the connected communication device that performs wireless communications with the vehicle telematics system. Using such wireless communications, the telematics data is provided to the connected communication device (operation 440), and the telematics data is encrypted by the connected communication device (operation 450). A record of the data is provided from the connected communication device to a decentralized notary service (operation 460), and this data record is established in a ledger such as a blockchain operated by the decentralized notary service (operation 470). The encrypted telematics data is maintained by the connected communication device in a user-controlled secure data store (operation 480), such as in storage memory of the connected communication device or in a remote data storage location accessible by the connected communication device.

Figure 5:
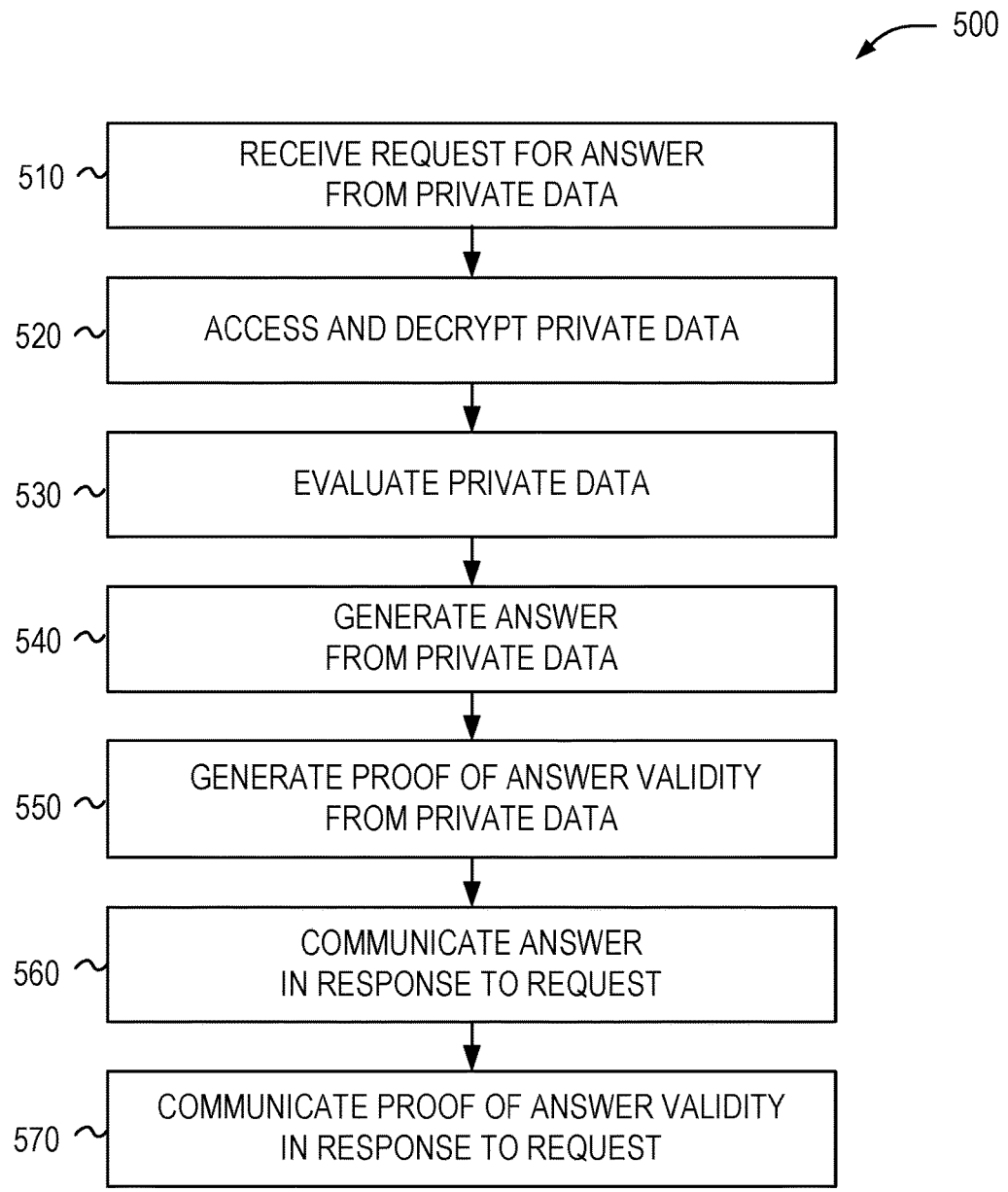
FIG. 5 illustrates a flowchart of a method performed for the verification of data collected from a motor vehicle telematics system, according to an example.

FIG. 5 illustrates a flowchart 500 of an example method performed for the verification of data collected from a motor vehicle telematics system, such as to supply and verify the validity of a particular data value (an answer) obtained from vehicle telematics data. In an example, the method of flowchart 500 is executed by features of a communication device (e.g., a mobile computing device), which comprises processing circuitry to perform the respective operations. However, it will be understood that the following techniques may be implemented into components of a telematics system, multiple communication devices, or a remote computing device (e.g., server).

As shown, the flowchart 500 begins with the receipt of a request for a data value (an answer) from a third party, where the answer may be obtained, calculated, derived, or otherwise provided from private telematics data (operation 510). Rather than providing the raw telematics data directly to the requesting third party, the communication device operates to generate the answer and a proof to validate the answer with the following technique.

In response to the request, the communication device accesses and decrypts the private data associated with the request (operation 520), and evaluates the private data (operation 530). For example, the communication device may use a private key that is secret to the communication device, which was used to encrypt the data. After encrypting and evaluating the private data (including performing respective calculations), an answer to the request is generated by the computing device (operation 540). Additionally, a proof of the answer validity is generated by the computing device (operation 550). This proof may correspond to the information regarding the data element that was previously sorted with a decentralized data service (such as performed with the method in FIG. 4).

Upon successful generation of the answer and the proof of answer validity, the answer is communicated to the requesting third party as a response to the request (operation 560), and the proof of the answer validity is also communicated to the requesting third party as a response to the request (operation 570). These responses may occur concurrently or in sequence to one other. Additionally, in some examples, the proof of the answer validity may be communicated to another third party (a fourth party) responsible for data validation and verification.

In an example, data is used on behalf of the owner or operator of the motor vehicle, rather than a third party. This may be used to generate a number of reports using the telematics data, including detailed analytics for the user. For example, telematics data may be used for generating driving profiles, predictions of when service needs to be performed, and other functions that may be analyzed within the motor vehicle. Many forms of data for these analytics exist in the vehicle but are typically not readily visible or accessible to respective users.

Other variations of software platforms may be used to perform analytics and assist users with accessing the information. Various open application programming interfaces (APIs) and other data exchange techniques may be operated and exposed for the communication of data among the respective devices. Additionally, although many of the techniques discussed herein were suggested for current forms of human-operated motor vehicles, these techniques may also be relevant to semi-autonomous and autonomous (e.g., self-driving) vehicles. Accordingly, the present techniques may also be used in other aspects of vehicle-to-vehicle communications, infrastructure, and transportation use cases.

Figure 6:
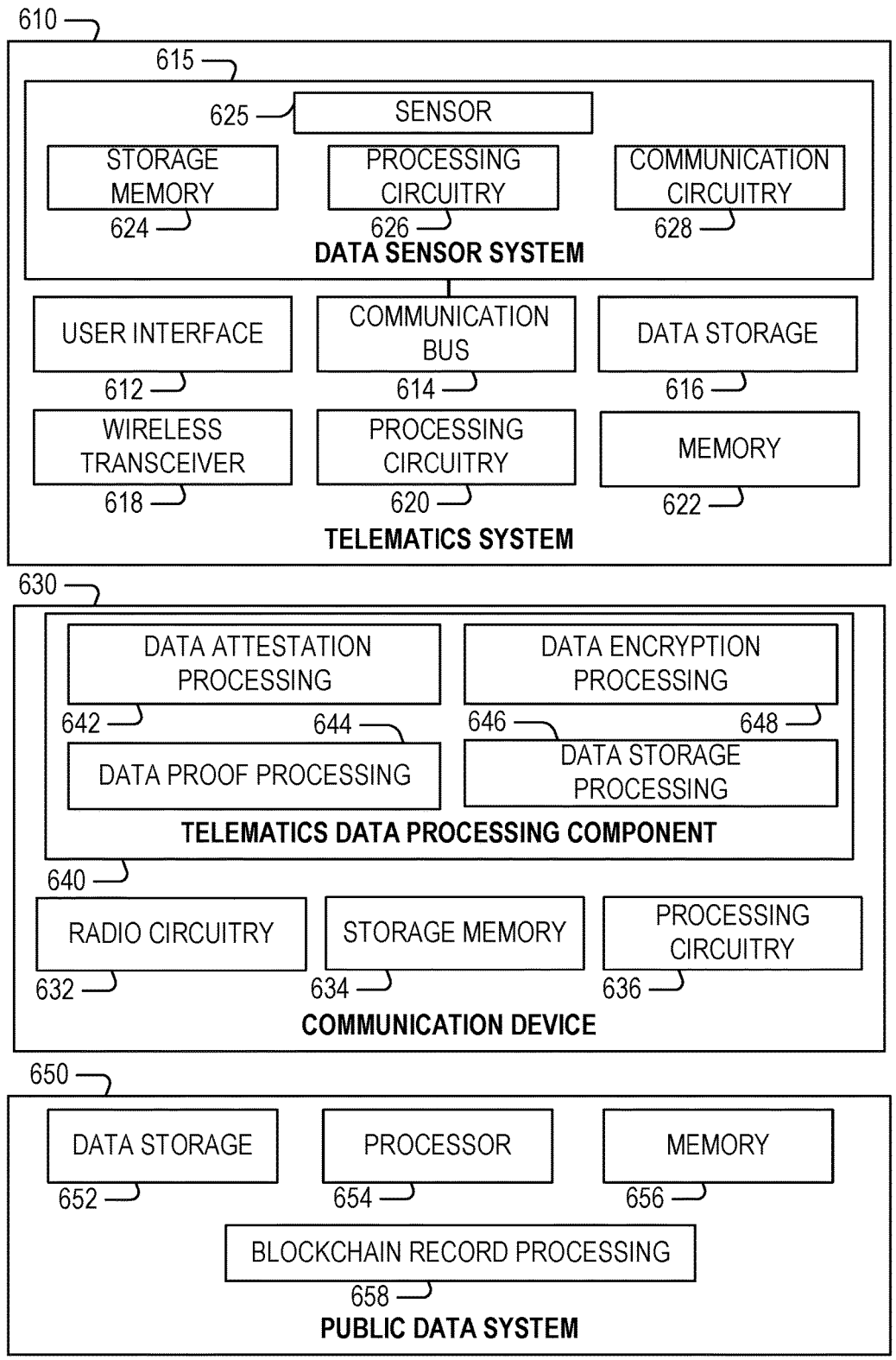
FIG. 6 illustrates a block diagram for an example system for storage and analysis of motor vehicle telematics data, according to an example.

FIG. 6 is a block diagram of an example system for storage and analysis of motor vehicle telematics data, including a telematics system 610, a communication device 630, and a public data system 650, implementing circuitry and structural electronic components that may be configured for implementation of the techniques described herein. In accordance with the previous described configurations, the system of FIG. 6 may have these devices operably coupled (e.g., communicatively coupled) with one another, but it will be understood that additional components (other computing devices, sensors, databases, and processing components) may be integrated at a variety of locations in the system. Further, the capabilities of the telematics system 610 and the communication device 630 may be integrated in some examples into a single unit (e.g., a motor vehicle with built-in communication, processing, and data storage capabilities).

The telematics system 610 is depicted as including a data sensor system 615, in addition to a user interface 612, a communication bus 614, data storage 616, a wireless transceiver 618, processing circuitry 620 (e.g., a CPU), and memory 622 (e.g., volatile or non-volatile memory). In an example, the data sensor system 615 may be provided from specialized hardware operating independent from the processing circuitry 620 and the memory 622; in other examples, the data sensor system 615 may be software-configured hardware that is implemented with use of the processing circuitry 620 and the memory 622 (e.g., a hardware state resulting from software instructions executed by a processor).

In the telematics system, the user interface 612 may be used to access and control data storage, connectivity, and system operations by a user, such as is provided in a user interface of an in-car display; the communication bus 614 is coupled to one or more data sensor systems (such as data sensor system 615) and may be used to communicate information among respective telematics systems and operational components of the motor vehicle; the data storage 616 may be used for temporary or long-term storage of telematics data from the motor vehicle; the wireless transceiver 618 may be used to communicate the sensor data from the telematics system 610 to the communication device 630, or to perform other wireless communications with communication networks.

The communication device 630 is depicted as including: radio circuitry 632, storage memory 634, processing circuitry 636 (e.g., a processor and memory, system-on-chip (SoC), etc.), and a telematics data processing component 640. The telematics data processing component 640 may be used to collect and process the telematics data in accordance with the encryption and verification operations described herein; the radio circuitry 632 may be used to perform respective wireless communications with the telematics system 610 (to obtain data); and the storage memory 634 may be used to provide a persistent data store for encrypted and user-controlled telematics data. Although the communication device 630 is described as being a separate computing device, its features may be combined in certain embodiments with those of the telematics system 610 (e.g., as a computing device integrated into the motor vehicle, integrated into another electronic device, or operating as a standalone device).

The telematics data processing component 640 of the communication device 630 may include respective processing components, such as implemented through specially configured hardware (including with specialized circuitry or with software executed with use of the processing circuitry 636), to perform data encryption processing 648 (e.g., to encrypt and decrypt the telematics data using a private encryption key), data storage processing 646 (e.g., to store encrypted telematics data in the storage memory and retrieve the encrypted telematics data from the storage memory), data attestation processing 642 (e.g., to generate a derived indication of the telematics data by operating a cryptographic hash function on the telematics data, with the derived indication of the telematics data to be stored in a blockchain of a remote data record system), and data proof processing 644 (e.g., to compute an answer using the telematics data and a proof of validity for the answer, in response to a request for the answer from a third party, wherein the proof of validity for the answer is verifiable using the derived indication of the telematics data to be retrieved from the blockchain of the remote data record system).

The system of FIG. 6 is further depicted as including the public data system 650, which may include data storage 652, a processor 654, a memory 656, and blockchain record processing 658, which may operate to store telematics data in a blockchain data record using the data storage 652. The public data system 650 may operate as a decentralized system with a plurality of nodes maintaining the blockchain ledger.

Although many of the previous examples were provided with reference to a decentralized, public ledger configuration for implementation with a blockchain data record, it will be understood that features of the presently described configuration may be hosted as part of other decentralized data services, such as a data service being hosted by a trusted third party. Other data processing services and validations may also be used with the system of FIG. 6. Further, many variations to the telematics system 610 and the telematics data processing component 640 may also be implemented.

Figure 7:
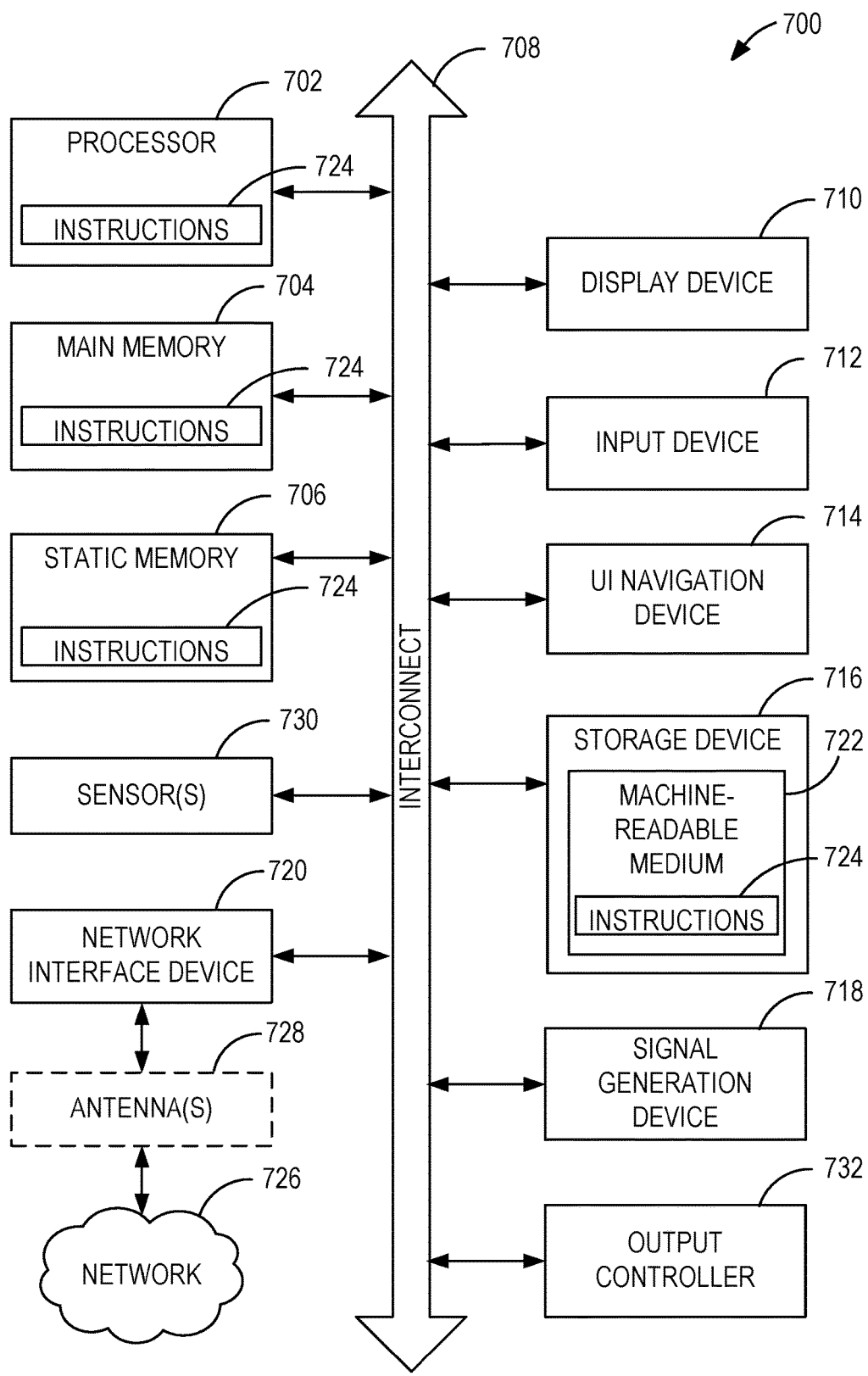
FIG. 7 illustrates a block diagram for an example computer system architecture upon which any one or more of the techniques (e.g., operations, processes, methods, and methodologies) discussed herein may be performed, according to an example.

FIG. 7 is a block diagram illustrating a machine in the example form of a computing system (e.g., computing device) 700, within which a set or sequence of instructions may be executed to cause the machine to perform any one of the methodologies discussed herein, according to an example embodiment. The machine may be a personal computer (PC), a tablet PC, a hybrid tablet/notebook PC, a personal digital assistant (PDA), a mobile telephone or smartphone, a wearable computer, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 700 includes at least one processor 702 (e.g., a central processing unit (CPU), a graphics processing unit (GPU) or both, processor cores, compute nodes, etc.), a main memory 704 and a static memory 706, which communicate with each other via an interconnect 708 (e.g., a link, a bus, etc.). The computer system 700 may further include a video display unit 710, an alphanumeric input device 712 (e.g., a keyboard), and a user interface (UI) navigation device 714 (e.g., a mouse). In one embodiment, the video display unit 710, input device 712 and UI navigation device 714 are incorporated into a touch screen display. The computer system 700 may additionally include a storage device 716 (e.g., a drive unit), a signal generation device 718 (e.g., a speaker), an output controller 732, a network interface device 720 (which may include or operably communicate with one or more antennas 728, transceivers, or other wireless communications hardware), and one or more sensors 730, such as a global positioning system (GPS) sensor, compass, accelerometer, location sensor, or other sensor.

The storage device 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, and/or within the processor 702 during execution thereof by the computer system 700, with the main memory 704, static memory 706, and the processor 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 724 may further be transmitted or received over a communications network 726 via an antenna 728 using a transmission medium via the network interface device 720 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 2G/3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Embodiments used to facilitate and perform the techniques described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices. Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is a communication device to process telematics data, comprising processing circuitry to: receive telematics data from a telematics system of a motor vehicle; transmit, to a data record system, a derived indication of the telematics data; compute an answer using the telematics data, in response to a request for the answer from a third party; and transmit, to the third party, the answer and a proof of validity for the answer, wherein the proof of validity for the answer is verified using the derived indication of the telematics data.

In Example 2, the subject matter of Example 1 optionally includes the processing circuitry further to: encrypt the telematics data using a private encryption key to produce encrypted telematics data; store the encrypted telematics data in a data storage location accessible to the communication device; and in response to the request for the answer from the third party: retrieve the encrypted telematics data from the data storage location accessible to the communication device; and decrypt the encrypted telematics data from the data storage location accessible to the communication device to produce decrypted telematics data; wherein operations to compute the answer using the telematics data are performed using the decrypted telematics data.

In Example 3, the subject matter of Example 2 optionally includes the processing circuitry further to: generate the derived indication of the telematics data by operating a cryptographic hash function on the telematics data.

In Example 4, the subject matter of any one or more of Examples 2-3 optionally include the processing circuitry further to: receive vehicle data from at least one operational subsystem or data sensor of the motor vehicle; encrypt the vehicle data using a private encryption key to produce encrypted vehicle data; store the encrypted vehicle data in the data storage location accessible to the communication device; and retrieve the encrypted vehicle data from the data storage location in response to a second request for the vehicle data.

In Example 5, the subject matter of any one or more of Examples 1-4 optionally include wherein the data record system utilizes a blockchain to log the derived indication of the telematics data.

In Example 6, the subject matter of Example 5 optionally includes wherein the proof of validity for the answer provides information for use in a zero knowledge proof, to enable the third party to determine validity for the answer with use of the proof of validity and the derived indication of the telematics data stored in the blockchain.

In Example 7, the subject matter of any one or more of Examples 5-6 optionally include the processing circuitry further to: retrieve, from the data record system, the derived indication of the telematics data; and compute the proof of validity for the answer, using the derived indication of the telematics data that is retrieved from the blockchain.

In Example 8, the subject matter of any one or more of Examples 1-7 optionally include the processing circuitry further to: request the telematics data from the telematics system of the motor vehicle.

In Example 9, the subject matter of any one or more of Examples 1-8 optionally include the processing circuitry further to: receive vehicle data from at least one operational subsystem or data sensor of the motor vehicle; and transmit, to the data record system, a derived indication of the vehicle data; wherein operations to compute the answer further include use of the vehicle data, and wherein the proof of validity for the answer is verified with use of the derived indication of the vehicle data.

In Example 10, the subject matter of any one or more of Examples 1-9 optionally include a transceiver to establish a wireless communication link with a communications transceiver of the motor vehicle; wherein the telematics data is received from the telematics system of the motor vehicle via the wireless communication link established between the transceiver of the communication device and the communications transceiver of the motor vehicle.

In Example 11, the subject matter of any one or more of Examples 1-10 optionally include wherein the telematics data received from the telematics system of the motor vehicle includes a hardware signature indicating a verified source within the motor vehicle.

Example 12 is at least one machine readable storage medium, comprising a plurality of instructions that, responsive to being executed with processor circuitry of a communication device, cause the communication device to process telematics data, with electronic operations that: receive telematics data from a telematics system of a motor vehicle; transmit, to a data record system, a derived indication of the telematics data; compute an answer using the telematics data, in response to a request for the answer from a third party; and transmit, to the third party, the answer and a proof of validity for the answer, wherein the proof of validity for the answer is verified using the derived indication of the telematics data.

In Example 13, the subject matter of Example 12 optionally includes wherein the electronic operations further: encrypt the telematics data using a private encryption key to produce encrypted telematics data; store the encrypted telematics data in a data storage location accessible to the communication device; and in response to the request for the answer from the third party: retrieve the encrypted telematics data from the data storage location accessible to the communication device; and decrypt the encrypted telematics data from the data storage location accessible to the communication device to produce decrypted telematics data; wherein operations to compute the answer using the telematics data are performed using the decrypted telematics data.

In Example 14, the subject matter of Example 13 optionally includes wherein the electronic operations further: generate the derived indication of the telematics data by operating a cryptographic hash function on the telematics data.

In Example 15, the subject matter of any one or more of Examples 13-14 optionally include wherein the electronic operations further: receive vehicle data from at least one operational subsystem or data sensor of the motor vehicle; encrypt the vehicle data using a private encryption key to produce encrypted vehicle data; store the encrypted vehicle data in the data storage location accessible to the communication device; and retrieve the encrypted vehicle data from the data storage location in response to a second request for the vehicle data.

In Example 16, the subject matter of any one or more of Examples 12-15 optionally include wherein the data record system utilizes a blockchain to log the derived indication of the telematics data.

In Example 17, the subject matter of Example 16 optionally includes wherein the proof of validity for the answer provides information for use in a zero knowledge proof, to enable the third party to determine validity for the answer with use of the proof of validity and the derived indication of the telematics data stored in the blockchain.

In Example 18, the subject matter of any one or more of Examples 16-17 optionally include wherein the electronic operations further: retrieve, from the data record system, the derived indication of the telematics data; and compute the proof of validity for the answer, using the derived indication of the telematics data that is retrieved from the blockchain.

In Example 19, the subject matter of any one or more of Examples 12-18 optionally include wherein the electronic operations further: request the telematics data from the telematics system of the motor vehicle.

In Example 20, the subject matter of any one or more of Examples 12-19 optionally include wherein the electronic operations further: receive vehicle data from at least one operational subsystem or data sensor of the motor vehicle; and transmit, to the data record system, a derived indication of the vehicle data; wherein the electronic operations to compute the answer further include use of the vehicle data, and wherein the proof of validity for the answer is verified with use of the derived indication of the vehicle data.

In Example 21, the subject matter of Example 20 optionally includes wherein the electronic operations further: establish a wireless communication link with a communications transceiver of the motor vehicle; wherein the telematics data is received from the telematics system of the motor vehicle via the wireless communication link established with the communications transceiver of the motor vehicle.

In Example 22, the subject matter of any one or more of Examples 12-21 optionally include wherein the telematics data received from the telematics system of the motor vehicle includes a hardware signature indicating a verified source within the motor vehicle.

Example 23 is a computing device adapted for telematics data processing, comprising: radio circuitry to wirelessly communicate with a telematics system of a motor vehicle; storage memory to store telematics data obtained from the telematics system of the motor vehicle; and telematics data processing circuitry, the telematics data processing circuitry configured to include: data attestation processing to generate a derived indication of the telematics data by operating a cryptographic hash function on the telematics data, wherein the derived indication of the telematics data is to be stored in a blockchain of a remote data record system; data encryption processing to encrypt and decrypt the telematics data using a private encryption key; data storage processing to store encrypted telematics data in the storage memory and retrieve the encrypted telematics data from the storage memory; and data proof processing to compute an answer using the telematics data and a proof of validity for the answer, in response to a request for the answer from a third party, wherein the proof of validity for the answer is verifiable using the derived indication of the telematics data to be retrieved from the blockchain of the remote data record system.

In Example 24, the subject matter of Example 23 optionally includes wherein the proof of validity for the answer provides information for use in a zero knowledge proof, to enable the third party to determine validity for the answer with use of the proof of validity and the derived indication of the telematics data stored in the blockchain.

In Example 25, the subject matter of Example 24 optionally includes wherein the telematics data processing circuitry further operates to request the telematics data from the telematics system of the motor vehicle.

In Example 26, the subject matter of Example 25 optionally includes wherein the telematics data from the telematics system of the motor vehicle is obtained from at least one operational subsystem or data sensor operating in the motor vehicle.

Example 27 is a telematics data processing system, comprising: a telematics system to collect telematics data of an operational system of a motor vehicle; a public data system, comprising data storage and blockchain record processing to store a derived indication of the telematics data in a blockchain data record using the data storage; and a connected computing device, comprising processing circuitry to: receive telematics data from the telematics system; transmit, to the public data system, the derived indication of the telematics data to be recorded in the blockchain data record; compute an answer using the telematics data; and transmit the answer and a proof of validity for the answer, wherein the proof of validity for the answer is verifiable using the derived indication of the telematics data as recorded in the blockchain data record.

In Example 28, the subject matter of Example 27 optionally includes storage memory to store an encrypted form of the telematics data obtained from the telematics system of the motor vehicle; wherein the storage memory and the connected computing device is integrated into the motor vehicle.

Example 29 is a method for telematics data processing, comprising electronic operations executed in processing circuitry of a computing system, wherein the electronic operations include: receiving telematics data from a telematics system of a motor vehicle; transmitting, to a data record system, a derived indication of the telematics data; computing an answer using the telematics data, in response to a request for the answer from a third party; and transmitting, to the third party, the answer and a proof of validity for the answer, wherein the proof of validity for the answer is verified using the derived indication of the telematics data.

In Example 30, the subject matter of Example 29 optionally includes the electronic operations further including: encrypting the telematics data using a private encryption key to produce encrypted telematics data; storing the encrypted telematics data in a data storage location accessible to the computing system; and in response to the request for the answer from the third party: retrieving the encrypted telematics data from the data storage location accessible to the computing system; and decrypting the encrypted telematics data from the data storage location accessible to the computing system to produce decrypted telematics data; wherein operations of computing the answer using the telematics data are performed using the decrypted telematics data.

In Example 31, the subject matter of Example 30 optionally includes the electronic operations further including: generating the derived indication of the telematics data by operating a cryptographic hash function on the telematics data.

In Example 32, the subject matter of any one or more of Examples 30-31 optionally include the electronic operations further including: receiving vehicle data from at least one operational subsystem or data sensor of the motor vehicle; encrypting the vehicle data using a private encryption key to produce encrypted vehicle data; storing the encrypted vehicle data in the data storage location accessible to the computing system; and retrieving the encrypted vehicle data from the data storage location in response to a second request for the vehicle data.

In Example 33, the subject matter of any one or more of Examples 29-32 optionally include wherein the data record system utilizes a blockchain to log the derived indication of the telematics data.

In Example 34, the subject matter of Example 33 optionally includes wherein the proof of validity for the answer provides information for use in a zero knowledge proof, to enable the third party to determine validity for the answer with use of the proof of validity and the derived indication of the telematics data stored in the blockchain.

In Example 35, the subject matter of any one or more of Examples 33-34 optionally include the electronic operations further including: retrieving, from the data record system, the derived indication of the telematics data; and computing the proof of validity for the answer, using the derived indication of the telematics data that is retrieved from the blockchain.

In Example 36, the subject matter of any one or more of Examples 29-35 optionally include the electronic operations further including: requesting the telematics data from the telematics system of the motor vehicle.

In Example 37, the subject matter of any one or more of Examples 29-36 optionally include the electronic operations further including: receiving vehicle data from at least one operational subsystem or data sensor of the motor vehicle; and transmitting, to the data record system, a derived indication of the vehicle data; wherein the electronic operations to compute the answer further include use of the vehicle data, and wherein the proof of validity for the answer is verified with use of the derived indication of the vehicle data.

In Example 38, the subject matter of Example 37 optionally includes the electronic operations further including: establishing a wireless communication link with a communications transceiver of the motor vehicle; wherein the telematics data is received from the telematics system of the motor vehicle via the wireless communication link established with the communications transceiver of the motor vehicle.

In Example 39, the subject matter of any one or more of Examples 29-38 optionally include wherein the telematics data received from the telematics system of the motor vehicle includes a hardware signature indicating a verified source within the motor vehicle.

Example 40 is an apparatus comprising means for performing any of the methods of Examples 29-39.

Example 41 is at least one machine readable medium including instructions, which when executed by a computing system, cause the computing system to perform any of the methods of Examples 29-39.

Example 42 is an apparatus, comprising: means for transmitting, to a data record system, a derived indication of telematics data from a telematics system of a motor vehicle; means for computing an answer using the telematics data, in response to a request for the answer from a third party; and means for transmitting, to the third party, the answer and a proof of validity for the answer, wherein the proof of validity for the answer is verified using the derived indication of the telematics data.

In Example 43, the subject matter of Example 42 optionally includes means for encrypting the telematics data using a private encryption key to produce encrypted telematics data; means for storing the encrypted telematics data in a data storage location; means for retrieving the encrypted telematics data from the data storage location, in response to the request for the answer from the third party: and means for decrypting the encrypted telematics data from the data storage location to produce decrypted telematics data, in response to the request for the answer from the third party; wherein the means for computing the answer using the telematics data uses the decrypted telematics data.

In Example 44, the subject matter of Example 41 optionally includes means for generating the derived indication of the telematics data by operating a cryptographic hash function on the telematics data.

In Example 45, the subject matter of any one or more of Examples 43-44 optionally include: means for receiving vehicle data from at least one operational subsystem or data sensor of the motor vehicle; means for encrypting the vehicle data using a private encryption key to produce encrypted vehicle data; means for storing the encrypted vehicle data in the data storage location; and means for retrieving the encrypted vehicle data from the data storage location in response to a second request for the vehicle data.

In Example 46, the subject matter of any one or more of Examples 42-45 optionally include means for logging the derived indication of the telematics data in a blockchain of the data record system.

In Example 47, the subject matter of Example 46 optionally includes means for generating the proof of validity for the answer to provide information for use in a zero knowledge proof, to enable the third party to determine validity for the answer with use of the proof of validity and the derived indication of the telematics data stored in the blockchain.

In Example 48, the subject matter of any one or more of Examples 46-47 optionally include means for retrieving, from the data record system, the derived indication of the telematics data; and means for computing the proof of validity for the answer, using the derived indication of the telematics data that is retrieved from the blockchain.

In Example 49, the subject matter of any one or more of Examples 42-48 optionally include means for requesting the telematics data from the telematics system of the motor vehicle.

In Example 50, the subject matter of any one or more of Examples 42-49 optionally include means for receiving vehicle data from at least one operational subsystem or data sensor of the motor vehicle; means for transmitting, to the data record system, a derived indication of the vehicle data; and means for computing the answer using of the vehicle data, wherein the proof of validity for the answer is verified with use of the derived indication of the vehicle data.

In Example 51, the subject matter of Example 50 optionally includes means for establishing a wireless communication link with a communications transceiver of the motor vehicle, wherein the telematics data is received from the telematics system of the motor vehicle via the wireless communication link established with the communications transceiver of the motor vehicle.

In Example 52, the subject matter of any one or more of Examples 42-51 optionally include wherein the telematics data received from the telematics system of the motor vehicle includes a hardware signature indicating a verified source within the motor vehicle.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A communication device to process telematics data, comprising processing circuitry to:
   receive telematics data from a telematics system of a motor vehicle;
   generate a derived indication of the telematics data by operating a cryptographic hash function on the telematics data;
   transmit, to a data record system, the derived indication of the telematics data;
   compute an answer using the telematics data, in response to a request for the answer from a third party; and
   transmit, to the third party, the answer and a proof of validity for the answer, wherein the proof of validity for the answer is verified using the derived indication of the telematics data, wherein the proof of validity for the answer provides information for use in a zero knowledge proof, to enable the third party to determine validity for the answer with use of the proof of validity and the derived indication of the telematics data.

2. The communication device of claim 1, the processing circuitry further to:
   encrypt the telematics data using a private encryption key to produce encrypted telematics data;
   store the encrypted telematics data in a data storage location accessible to the communication device; and
   in response to the request for the answer from the third party:
      retrieve the encrypted telematics data from the data storage location accessible to the communication device; and
      decrypt the encrypted telematics data from the data storage location accessible to the communication device to produce decrypted telematics data;
      wherein operations to compute the answer using the telematics data are performed using the decrypted telematics data.

3. The communication device of claim 2, the processing circuitry further to:
   receive vehicle operational data from at least one operational subsystem or data sensor of the motor vehicle;
   encrypt the vehicle operational data using a private encryption key to produce encrypted vehicle operational data;
   store the encrypted vehicle operational data in the data storage location accessible to the communication device; and
   retrieve the encrypted vehicle operational data from the data storage location in response to a second request for the vehicle operational data.

4. The communication device of claim 1,
   wherein the data record system utilizes a blockchain to log the derived indication of the telematics data.

5. The communication device of claim 4, the processing circuitry further to:
   retrieve, from the data record system, the derived indication of the telematics data; and
   compute the proof of validity for the answer, using the derived indication of the telematics data that is retrieved from the blockchain.

6. The communication device of claim 1, the processing circuitry further to:
request the telematics data from the telematics system of the motor vehicle.

7. The communication device of claim 1, the processing circuitry further to:
receive vehicle data from at least one operational subsystem or data sensor of the motor vehicle; and
transmit, to the data record system, a derived indication of the vehicle data;
wherein operations to compute the answer further include use of the vehicle data, and wherein the proof of validity for the answer is verified with use of the derived indication of the vehicle data.

8. The communication device of claim 1, further comprising:
a transceiver to establish a wireless communication link with a communications transceiver of the motor vehicle;
wherein the telematics data is received from the telematics system of the motor vehicle via the wireless communication link established between the transceiver of the communication device and the communications transceiver of the motor vehicle.

9. The communication device of claim 1,
wherein the telematics data received from the telematics system of the motor vehicle includes a hardware signature indicating a verified source within the motor vehicle.

10. At least one non-transitory machine readable storage medium, comprising a plurality of instructions that, responsive to being executed with processor circuitry of a communication device, cause the communication device to process telematics data, with electronic operations that:
receive telematics data from a telematics system of a motor vehicle;
generate a derived indication of the telematics data by operating a cryptographic hash function on the telematics data;
transmit, to a data record system, the derived indication of the telematics data;
compute an answer using the telematics data, in response to a request for the answer from a third party; and
transmit, to the third party, the answer and a proof of validity for the answer, wherein the proof of validity for the answer is verified using the derived indication of the telematics data, wherein the proof of validity for the answer provides information for use in a zero knowledge proof, to enable the third party to determine validity for the answer with use of the proof of validity and the derived indication of the telematics data.

11. The machine readable storage medium of claim 10, wherein the electronic operations further:
encrypt the telematics data using a private encryption key to produce encrypted telematics data;
store the encrypted telematics data in a data storage location accessible to the communication device; and
in response to the request for the answer from the third party:
retrieve the encrypted telematics data from the data storage location accessible to the communication device; and
decrypt the encrypted telematics data from the data storage location accessible to the communication device to produce decrypted telematics data;
wherein operations to compute the answer using the telematics data are performed using the decrypted telematics data.

12. The machine readable storage medium of claim 11, wherein the electronic operations further:
receive vehicle operational data from at least one operational subsystem or data sensor of the motor vehicle;
encrypt the vehicle operational data using a private encryption key to produce encrypted vehicle operational data;
store the encrypted vehicle operational data in the data storage location accessible to the communication device; and
retrieve the encrypted vehicle operational data from the data storage location in response to a second request for the vehicle operational data.

13. The machine readable storage medium of claim 10, wherein the data record system utilizes a blockchain to log the derived indication of the telematics data.

14. The machine readable storage medium of claim 13, wherein the proof of validity further enables the third party to determine validity for the answer with use of the proof of validity and the derived indication of the telematics data stored in the blockchain.

15. The machine readable storage medium of claim 13 wherein the electronic operations further:
retrieve, from the data record system, the derived indication of the telematics data; and
compute the proof of validity for the answer, using the derived indication of the telematics data that is retrieved from the blockchain.

16. The machine readable storage medium of claim 10, wherein the electro operations further:
request the telematics data from the telematics system of the motor vehicle.

17. The machine readable storage medium of claim 10, wherein the electronic operations further:
receive vehicle data from at least one operational subsystem or data sensor of the motor vehicle; and
transmit, to the data record system, a derived indication of the vehicle data;
wherein the electronic operations to compute the answer further include use of the vehicle data, and wherein the proof of validity for the answer is verified with use of the derived indication of the vehicle data.

18. The machine readable storage medium of claim 17, wherein the electronic operations further:
establish a wireless communication link with a communications transceiver of the motor vehicle;
wherein the telematics data is received from the telematics system of the motor vehicle via the wireless communication link established with the communications transceiver of the motor vehicle.

19. The machine readable storage medium of claim 10, wherein the telematics data received from the telematics system of the motor vehicle includes a hardware signature indicating a verified source within the motor vehicle.

20. A computing device adapted for telematics data processing, comprising:
radio circuitry to wirelessly communicate with a telematics system of a motor vehicle;
storage memory to store telematics data obtained from the telematics system of the motor vehicle; and
telematics data processing circuitry, the telematics data processing circuitry configured to include:

data attestation processing to generate a derived indication of the telematics data by operating a cryptographic hash function on the telematics data, wherein the derived indication of the telematics data is to be stored in a blockchain of a remote data record system;

data encryption processing to encrypt and decrypt the telematics data using a private encryption key;

data storage processing to store encrypted telematics data in the storage memory and retrieve the encrypted telematics data from the storage memory; and data proof processing to compute an answer using the telematics data and a proof of validity for the answer, in response to a request for the answer from a third party, wherein the proof of validity for the answer provides information for use in a zero knowledge proof, and wherein the proof of validity is verifiable using the derived indication of the telematics data to be retrieved from the blockchain of the remote data record system, to enable the third party to determine validity for the answer with use of the proof of validity and the derived indication of the telematics data.

21. The computing device of claim 20, wherein the proof of validity further enables the third party to determine validity for the answer with use of the proof of validity and the derived indication of the telematics data stored in the blockchain.

22. The computing device of claim 20, wherein the telematics data processing circuitry further operates to request the telematics data from the telematics system of the motor vehicle.

23. The computing device claim 22, wherein the telematics data from the telematics system of the motor vehicle is obtained from at east one operational subsystem or data sensor operating in the motor vehicle.

* * * * *

UNITED STATES PATENT AND TRADEMARK OFFICE
CERTIFICATE OF CORRECTION

PATENT NO. : 10,284,654 B2  
APPLICATION NO. : 15/277066  
DATED : May 7, 2019  
INVENTOR(S) : Alvarez et al.

Page 1 of 1

It is certified that error appears in the above-identified patent and that said Letters Patent is hereby corrected as shown below:

On the Title Page

Below Abstract should read:
29 Claims, 7 Drawing Sheets

In the Claims

In Column 22, Line 34, in Claim 16, delete "electro" and insert --electronic-- therefor In Column 24, Line 14, in Claim 23, after "device", insert --of--

In Column 24, Line 16, in Claim 23, delete "east" and insert --least-- therefor

Signed and Sealed this
Twelfth Day of May, 2020

Andrei Iancu
*Director of the United States Patent and Trademark Office*